Figure 1:
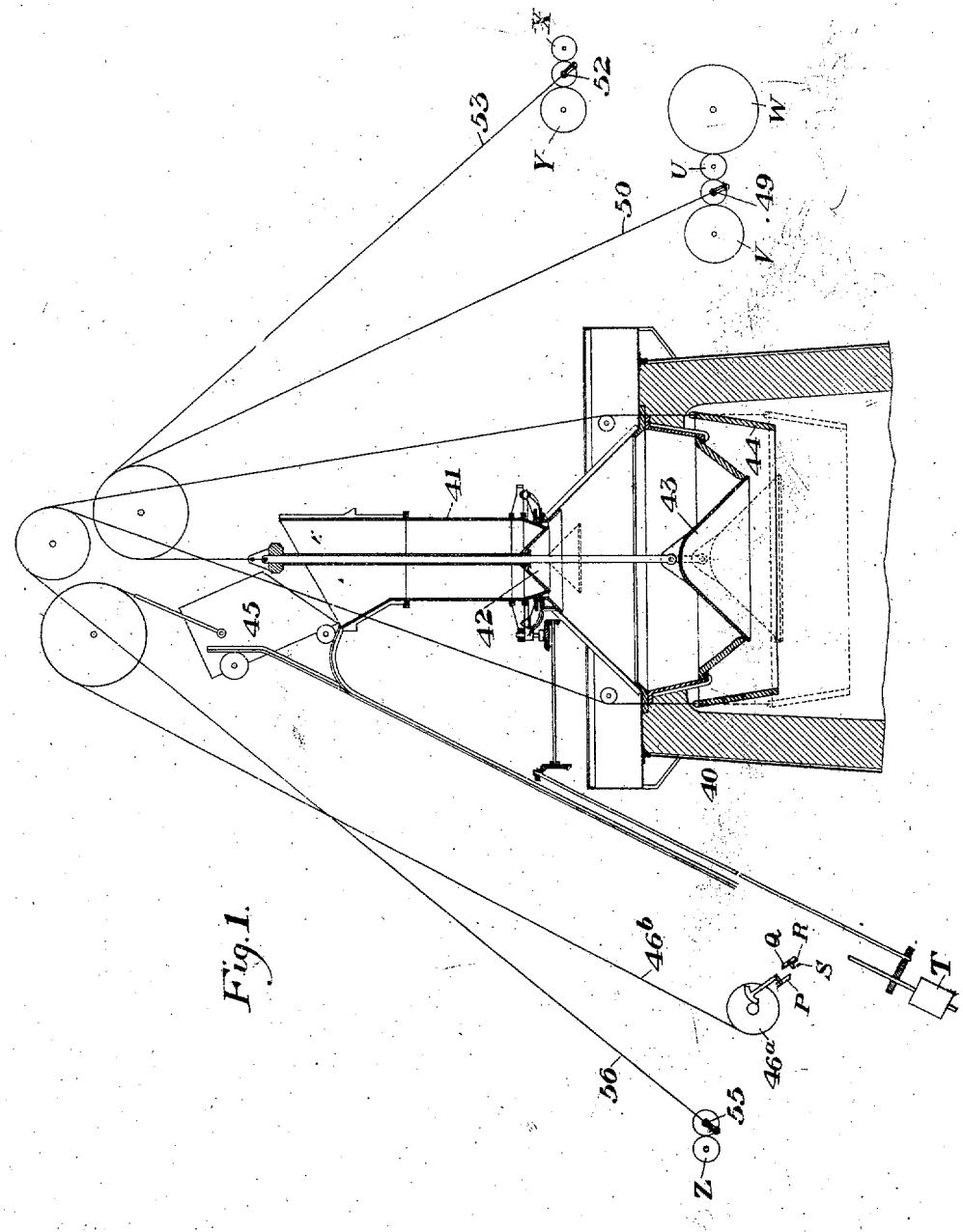

No. 868,711. PATENTED OCT. 22, 1907.
B. R. SHOVER.
MEANS FOR CONTROLLING THE OPERATIONS OF BLAST FURNACE
CHARGING DEVICES.
APPLICATION FILED JAN. 12, 1906.

2 SHEETS—SHEET 1.

WITNESSES
Warren W. Swartz
R. A. Balderson

INVENTOR
B. R. Shover.
by Bakewell & Byrnes
Attys

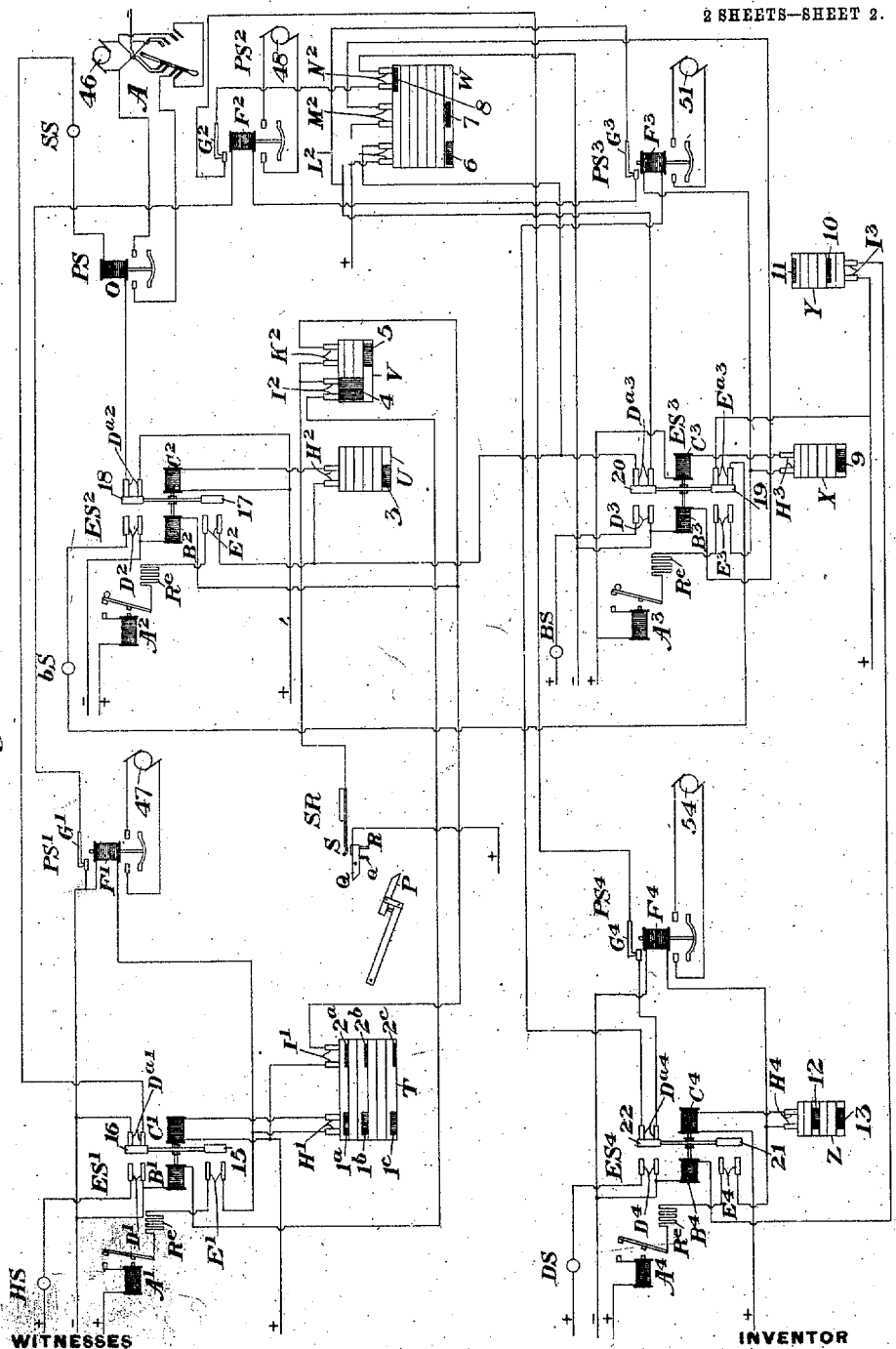

UNITED STATES PATENT OFFICE.

BARTON R. SHOVER, OF YOUNGSTOWN, OHIO.

MEANS FOR CONTROLLING THE OPERATIONS OF BLAST-FURNACE-CHARGING DEVICES.

No. 868,711.    Specification of Letters Patent.    Patented Oct. 22, 1907.

Application filed January 12, 1906. Serial No. 295,685.

*To all whom it may concern:*

Be it known that I, BARTON R. SHOVER, of Youngstown, Mahoning county, Ohio, have invented a new and useful Means for Controlling the Operations of Blast-Furnace-Charging Devices, of which the following is a full, clear, and exact description, reference being had to the accompanying drawings, forming part of this specification, in which—

Figure 1 is a diagrammatic view showing the movable parts of the furnace whose operations are controlled, and also the contact devices actuated thereby; and Fig. 2 is a wiring diagram showing the electrical circuits and connections, the various contact drums being shown in development.

In the operation of blast furnaces, it is essential to the proper working of the furnace that a certain predetermined cycle of charging operations shall be performed, each step of the cycle being done at the proper time, and only when all the predetermined steps have been completed.

The object of this invention is to provide effective and practical means whereby the operations of the various movable parts of a furnace charging device, or of any two or more of such movable parts, may be so automatically controlled that the operator is of necessity compelled to operate them in a predetermined order or cycle.

To this end, my invention consists broadly in the provision of means whereby the motive devices which actuate the moving parts of the charging devices are each rendered inoperative except at the times when the proper precedent operations have all been performed.

In the drawings, I have shown my invention as applied to the control of the skip hoist, a revolving hopper, an upper bell (or gas seal), a main bell, and a vertically movable distributer, in such a manner that the operation of each is made dependent upon the proper relative operations of the others; but it will be readily understood that the invention is equally applicable to the control of any two or more of these parts. I have also illustrated the proper circuit closing devices and connections for a certain predetermined cycle of operations hereinafter described, but by changing the ratios of the gears, or other connecting devices, by which the movable contact carriers or drums are actuated, or by changing the number or position of the movable contacts, or both, the cycles of operation and the steps going to make up the same, may be changed to suit the work of any particular furnace or to vary the method of charging any one furnace as may be desired.

In carrying out my invention, the movable charging devices are each provided with a separate driving mechanism. I have shown, and prefer to employ separate electric motors for this purpose, but motors or cylinders actuated by steam, compressed air, or hydraulic power, may be used, or two or more of the devices may be driven from the same shaft by means of magnetic or friction clutches.

In connection with each motor I provide, in the arrangement shown, switch mechanism for opening and closing each circuit, the operation of this switch mechanism being controlled by circuit-making and breaking devices, actuated by the movable parts of the furnace charging apparatus, each such switch mechanism being controlled by the movement of one or more of the other furnace charging parts, and the circuits being so interconnected and interdependent that the circuit of any particular motor cannot be closed except upon the completion of the precedent operations. I also preferably provide in the motor circuits pilot or safety switches by which the motor circuits are ultimately closed, and which are further arranged to actuate circuit-making and breaking devices interposed in the several controlling circuits, these devices acting to positively prevent the premature operation of any motor by reason of temporary circuit conditions which might otherwise be established. When steam, compressed air, or hydraulic motors, or cylinders, are employed, in lieu of these pilot switches, the actuating levers or controlling handles of the motors may be locked and released electro-magnetically, and the same results secured. And when the charging parts are driven through clutch mechanism, the clutch mechanism may be similarly controlled.

My invention also consists in the novel construction, arrangement and combination of the parts all substantially as hereinafter described and pointed out in the appended claims.

In the drawings, 40 designates the furnace top, 41 the rotary hopper, 42 the upper or small bell, 43 the lower or main bell, 44 he vertically movable distributer, and 45 the skip car. 46 is the motor for actuating the skip, through the drum 46$^a$ and cable 46$^b$, 47 the motor for revolving the hopper 41; 48 the motor which actuates the upper bell through the crank shaft 49 and the cable 50. 51 is the motor which operates the lower bell through the crank shaft 52 and cable 53. 54 is the motor which actuates the distributer 44 through the crank shaft 55 and the cable 56. These are the usual parts of a blast furnace of this type.

A, A', A$^2$, A$^3$ and A$^4$, are the respective hand switches or controllers which are closed by the operator for operating the skip hoist, the revolving hopper, the upper bell, the main bell, and the distributer.

ES', ES$^2$, ES$^3$ and ES$^4$ are electro-magnetic controlling switches through which the circuits of the controllers A', A$^2$, A$^3$ and A$^4$ are respectively made. These four controlling switches, as shown, are all of substantially similar construction, and consist each of three or four sets of fixed contacts, a movable switch member carrying coöperating contacts, and two oppositely arranged solenoids for moving the movable member from one position to the other.

In the switch ES', B' and C' designate the two solenoids; E', D' and D$^{a\prime}$, the three sets of fixed contacts, and 15 and 16 the two movable contacts carried by the movable member of the switch, the contacts D' and D$^{a\prime}$, being located oppositely to each other and bridged by the contacts 16 in the respective positions of the movable switch member, and the contacts E' arranged to be bridged by the movable contact 15 in one position of such member. The contacts D', together with the contacts 16, control the hopper signal HS, which is preferably an electric lamp, although it may be any suitable electrically operated signal. The two contacts E', together with the contact 15, complete the circuit to the controller A', and the two contacts D$^{a\prime}$ with the contact 16, control in part the circuit of the coil O of the pilot switch PS for the skip motor 46.

In the switch ES$^2$ the fixed contacts D$^2$ with the movable contact 18 control the upper bell signal BS; the fixed contacts E$^2$ with the movable contact 17 complete the circuit of the controller A$^2$, and the two contacts D$^{a2}$ with the movable contact 18 control in part the circuit of the solenoid coil O of the pilot switch PS of the skip motor. B$^2$ and C$^2$ are the solenoids which actuate the movable member of this switch.

In the switch ES$^3$ the fixed contacts D$^3$ and the movable contact 20 complete the circuit of the main bell signal BS. The fixed contacts E$^3$ and the movable contact 19 complete the circuit of the main bell controller A$^3$, and the fixed contacts D$^{a3}$ and movable contact 20 have the functions hereinafter described. This switch has also an extra pair of fixed contacts E$^{a3}$ which, when bridged by the contact 19, complete circuits hereinafter described. B$^3$ and C$^3$ are the actuating solenoids for this switch.

In the switch ES$^4$, the fixed contacts D$^4$ with the movable contact 22 control the distributer signal DS. The fixed contact E$^4$ and the movable contact 21 complete the circuit of the distributer controller A$^4$, and the fixed contacts D$^{a4}$ with the movable contact 22 control in part the circuit of the magnet coil F$^3$ of the pilot switch PS$^3$ of the main bell motor. B$^4$ and C$^4$ are the actuating solenoids for this switch.

Each of the four switches, ES', ES$^2$, ES$^3$ and ES$^4$ has a resistance R$^e$ in series with its controller, the purpose of which will hereinafter appear. Each of the four pilot switches, PS', PS$^2$, PS$^3$ and PS$^4$ has its coil in series with the corresponding controller. The coil O of the skip motor pilot switch PS has its coil in series with the contacts D$^{a\prime}$ and D$^{a2}$ of the switches ES' and ES$^2$, so that the circuit of such coil cannot be closed except when both these switches are in proper position.

T is a contact drum geared to or otherwise actuated by the revolving hopper 41, in such a manner as to make two revolutions to every three revolutions of the hopper. Carried on this drum are three contacts, 1$^a$, 1$^b$ and 1$^c$, contacts 1$^a$ and 1$^b$ being spaced 120 degrees apart from center to center; contacts 1$^b$ and 1$^c$, 180 degrees apart, and 1$^c$ and 1$^a$, 60 degrees apart. These contacts are arranged to bridge relatively fixed contact fingers H', one of which is connected to the solenoid coil C' of the switch ES', and through such coil to one side of the supply circuit, and the other of which is connected through magnet coil F' of the pilot switch PS' to the other side of the circuit. The drum T also has three other contacts 2$^a$, 2$^b$, 2$^c$, which are spaced similarly to the contacts 1$^a$, 1$^b$ and 1$^c$, but which are shown as narrower and are not engaged by their contact fingers I' until after the corresponding engagements of the fingers H'. One finger I' is connected to one side of the supply circuit, and the other finger is connected to the coil B$^2$ of the switch ES$^2$ and to a contact finger K$^2$ of another contact drum V hereinafter described.

U is a contact drum, which is geared directly to, or otherwise actuated by, the main shaft of the upper bell-actuating motor 48, so as to make one complete revolution each time the bell opens and closes. This drum carries a single contact 3 arranged, in one position of the drum, to bridge a pair of contact fingers H$^2$, one of which is connected to one side of the supply circuit through the solenoid coil C$^2$ of the switch ES$^2$, and the other of which is connected in series with the coil F$^2$ of the pilot switch PS$^2$ of the small bell motor 48.

V is a third drum which is geared to, and actuated by the main shaft of the upper bell actuating motor 48, so as to make one revolution for each four complete operations of the bell. This drum carries a contact 4, which bridges contact fingers I$^2$ during three-fourths of the revolution of the drum, and also a second contact 5 which is arranged to bridge a second pair of contact fingers K$^2$ during the remaining one-fourth revolution, the arrangement being such that one of these two contacts, but not both of them, is always bridging one pair of the fingers. One of the fingers I$^2$ is connected to one side of the line through the solenoid coil B' of the switch ES', and the other finger I$^2$ is connected to the other side of the line through a normally open skip-operated switch SR, hereinafter described. One of the fingers K$^2$ is connected in multiple with the second described finger I$^2$, and the other one is connected in multiple with one of the fingers I' of the drum T, as before described, and also with the coil B$^2$ of the switch ES$^2$, whereby when the fingers K$^2$ are bridged by the contact 5, the circuit of the coil B$^2$ may be completed independently of the hopper-controlled drum T.

W is a third drum geared to, or otherwise actuated by, the upper bell motor so as to make one complete revolution to each seven complete operations of the bell. This drum carries three contacts, 6, 7 and 8, arranged to bridge respectively the three pairs of contact fingers L$^2$, M$^2$ and N$^2$. These contacts 6, 7 and 8 are so arranged that 6 and 7 simultaneously bridge the fingers L$^2$ and M$^2$, and immediately after these contacts open, the contact 8 will bridge the fingers N$^2$. One of the fingers L$^2$ is connected with the coil F$^2$ of the upper bell motor pilot switch PS$^2$, and thence to one side of the circuit, while the other of said fingers is connected to one of the contacts D$^{a3}$ of the switch ES$^3$. One of the fingers M$^2$ is connected directly to one side of the supply circuit, and the other finger is connected to the other side of the circuit through the solenoid coil B$^3$ of the switch ES$^3$. One of the fingers N$^2$ is connected through the contacts D$^{a4}$ and 22 of the switch ES$^4$ with the coil F$^3$ of the pilot switch PS$^3$ of the main bell lowered, and the upper bell dumped without revolving the hopper. These operations are repeated until seven skip loads have been deposited on the main bell. The main bell is then dumbed, and the distributer, which has been in its lowered position, is raised. The foregoing operations as a whole, in the same order, are then twice repeated, and the distributer is then lowered, which completes the cycle.

The diagram, Fig. 2, shows the coil O of the pilot switch PS energized, the skip-up-circuit closed, except at the controller A, whose pilot lamp SS is lighted.

Referring to the cycle of operations above set forth, the operations are as follows:—The controller A is closed, the skip hoisted, discharged and lowered. The lowering of the skip closes the contacts R and S and energizes the coil B' of the switch ES'. This moves the movable member of that switch over to the left, opening the contacts $D^{a\prime}$ and closing the circuit at the contacts D' and E'. Closing D' lights the hopper signal HS, while closing the circuit at E', completes the circuit of the coil F' of the hopper motor pilot switch PS' except at the controller A'. The handle of the controller A' is now moved to closed position, which energizes the coil F' and closes the pilot switch PS', thereby opening the switch G' and starting the hopper motor. The drum T revolves with the hopper until its contact $1^a$ bridges the fingers H', thereby paralleling the contacts E', the resistance $R^v$ causing a drop in potential, which results in the energization of the coil C'. This coil then pulls the movable switch member back to its original position, opening the circuit at E' and D' and closing it at $D^{a\prime}$. At this time the contact $2^a$ bridges the fingers I'. Opening the circuit at D' extinguishes the pilot light HS, and opening the circuit at E' opens the circuit of the controller A', which falls open by gravity or by the action of a spring. The closing of the circuit at I' energizes the coil $B^2$ of the switch $ES^2$, thereby actuating the movable member of that switch to close the circuit at $D^2$ and $E^2$ and open it at $B^{a2}$. Closing the circuit at $D^2$ lights the pilot lamp bS for the small bell controller, while closing the circuit at $E^2$ closes the circuit of the coil $F^2$ of the small bell pilot motor switch $PS^2$ through the contacts $D^{a3}$ and the make and break switch $G^3$. This circuit is, however, still open at G' and at the controller $A^2$. Opening the circuit at $D^{a2}$, opens the circuit of the coil O of the pilot switch PS. When the drum T has revolved 60 degrees, the circuit is broken at H', which cuts out the coil F' and thereby closes the circuit at G'. The small bell can now be dumped. This is done by closing the controller $A^2$, which energizes the coil $F^2$ of the pilot switch $PS^2$, thereby starting the small bell motor and opening the switch $G^2$. The drum U revolves until its contact 3 bridges the fingers $H^2$, which energizes the coil $C^2$ and causes the opening of the switch $ES^2$ and $D^2$ and $E^2$, and closing $D^{a2}$. Opening $D^2$ extinguishes the pilot lamp bS, and opening the circuit at $E^2$ opens the circuit of the controller $A^2$. Closing the circuit at $D^{a2}$ energizes the coil O of the pilot switch PS, which closes the skip-up circuit and lights its pilot lamp SS. The continued revolution of the drum U opens the circuit at $H^2$, which cuts out the coil $F^2$ of the switch $PS^2$ and closes $G^2$. The drum V has now revolved 90 degrees without changing the circuit at the contacts $I^2$ and $K^2$, and the drum W has made one-seventh of the revolution, which opens the contacts $N^2$, without any effect, however, at this time on the circuits. These operations are now repeated until seven loads have been discharged by the upper bell to the main bell, the operations being the same as described, except that when the drum V has revolved 270 degrees, the contacts $I^2$ are open and the contacts $K^2$ are closed, thereby energizing the coil $B^2$ so that the little bell may be dumped at this time without first revolving the hopper. As the small bell is dumped the seventh time, the drum W is making the last one-seventh of its complete revolution, and the contact fingers $L^2$ and $M^2$ are closed by the contacts 6 and 7. Closing $L^2$ parallels the contacts $D^{a3}$, and closing $M^2$ energizes the coil $B^3$ of the switch $ES^3$, thereby closing the circuit at $D^3$ and $E^3$ and opening it at $D^{a3}$ and $E^{a3}$. Closing $D^3$ lights the pilot signal BS for the main bell controller. Closing $E^3$ closes the circuit for the coil $F^3$ of the main bell motor pilot switch $PS^3$ except at the controller $A^3$, the contacts $N^2$ and the switch $G^2$. As the drum W completes its full revolution, the contacts at $M^2$ and $L^2$ are opened, and the contact at $N^2$ is closed. The opening of the circuit at $L^2$ opens the circuit of the coil $F^2$ and stops the operation of the small bell motor, at the same time closing the circuit at $G^2$. The main bell can now be dumped, which is done by closing the handle of the controller $A^3$. This energizes the coil $F^3$ of the pilot switch $PS^3$, starting the main bell motor and opening the circuit at $G^3$. The drum X is now revolved, which causes the contact 9 to close the circuit at $H^3$, thereby energizing the coil $C^3$ and actuating the switch $ES^3$ to open the circuit at $D^3$ and $E^3$ and close the circuit at $D^{a3}$ and $E^{a3}$. Closing the circuit at $D^{a3}$ completes the circuit of the coil $F^2$ except at the points $A^2$, $E^2$ and $G^3$. Closing the circuit at $E^{a3}$ closes the circuit of the bell lamp bS except at the point $D^2$. The drum Y has now revolved 120 degrees, which closes the circuit at $I^3$, and thereafter again opens it. Closing the circuit at $I^3$ energizes the coil $B^4$, which actuates the switch $ES^4$ to close the contacts $D^4$ and $E^4$ and open the contacts $D^{a4}$. Closing the circuit at $D^4$ lights the pilot lamp DS for the distributer controller, and closing the circuit at $E^4$ closes the circuit of the coil $F^4$ of the pilot switch $PS^4$ except at the controller $A^4$. The distributer motor may now be operated for raising the distributer. This is done by closing the handle of the controller $A^4$, thereby completing the circuit of coil $F^4$, which starts the distributer motor, and at the same time opens the switch $G^4$. The drum Z now revolves until the contacts $H^4$ are closed by the contact 12, thereby energizing the coil $C^4$ to return the switch $ES^4$ to its former position, thus opening the circuit of controller $A^4$ and extinguishing the signal DS. When the drum Z is revolved 180 degrees, which corresponds to raising the distributer, the contacts $H^4$ are opened, thereby cutting out the coil $F^4$, which stops the distributer motor and closes the switch $G^4$.

All of the foregoing operations are now repeated twice, and upon the completion of the second sub-cycle, the contact 11 of the drum Y closes the circuit at $I^3$, which makes it necessary to now lower the distributer and thus complete the full cycle. This remotor, and thence to one side of the supply circuit, and the other finger $N^2$ is connected directly to the other side of the supply circuit.

X is a contact drum, which is geared directly to the main actuating shaft for the main bell, or which is otherwise actuated by the main bell, to make one complete revolution to each complete operation of the bell. This drum carries a contact 9, which, in one position of the drum, is arranged to bridge the contact fingers $H^3$. One finger $H^3$ is connected to one side of the supply circuit through the magnet coil $C^3$ of the switch $ES^3$, and the other one is connected to the other side of the circuit through the coil $F^3$ of the main bell motor pilot switch $PS^3$, through the drum W and the contacts $D^{34}$ of the switch $ES^4$.

Y is a second contact drum, which is geared to, or otherwise actuated by, the main bell operating mechanism to make one revolution to each three complete operations of the bell. This drum carries two contacts 10 and 11 spaced 120 and 240 degrees apart, and arranged to bridge contact fingers $I^3$, one of which is connected directly to one side of the supply circuit, and the other of which is connected to the other side of the circuit through the coil $B^4$ of the switch $ES^4$.

Z is a contact carrying drum, actuated by the distributer, and making one revolution to each complete movement of the distributer. This drum carries two contacts 12 and 13 spaced 180 degrees between centers, which are arranged to bridge contact fingers $H^4$, one of which is connected to one side of the line through the solenoid coil $C^4$ of the switch $ES^4$, and the other of which is connected to the other side of the line through the solenoid coil $F^4$ of the pilot switch $PS^4$ of the distributer motor.

The skip-operated switch SR, before referred to, consists of a relatively fixed contact S and a movable contact R, the latter carried by lever Q having a spring $q$ which normally holds the contacts R and S separated.

P is a lever having a yielding end portion, and which is operated by the skip movement to actuate the lever Q on the down movement of the skip to close the contacts S and R. The levers P and Q are shown as having beveled contact ends, which will ride by each other on the upward movement of the lever P, but which on a down movement of this lever, will operate to move the lever Q to cause the engagement of the contacts R and S. The contact R is connected to one side of the supply circuit, and the contact S is connected with the solenoid coil $B'$ of the switch $ES'$ through the drum V, before described.

Since the energization of the coil $B'$, in order to actuate the movable contacts 15 and 16 is necessary, in closing of the circuit of the hopper controller $A'$, the hopper cannot be rotated until after the skip has dumped its load and is on its down movement. On the other hand, since the solenoid coil O of the pilot switch PS of the skip-up circuit is in series with the contacts $DA'$ and $DA^2$ of the switches $ES'$ and $ES^2$, the skip cannot be run up until the hopper and the small bell have completed their operations.

The drum T, by controlling the energization of the coil $C^2$ of the switch $ES^2$ by its contacts $1^a$, $1^b$ and $1^c$, controls the opening of the circuit of the controller $A'$ of the hopper motor; and also through the fingers $I'$ and contacts $2^a$, $2^b$, $2^c$, in conjunction with the contact 5 and fingers $K^2$ of the drum V, controls the closing of the circuit of the magnet coil $B^2$ of the switch $ES^2$. The upper bell cannot, therefore, be operated except after the hopper has completed its revolution, except at each fourth operation of the bell, when it is not desired to rotate the hopper. At this time the circuit of the coil $B^2$ is closed through the contact 5 of the drum V, independently of the drum T.

The drum U controls the opening of the circuit of the upper bell controller $A^2$, when the bell has completed its operation. The drum W, through the coil $B^3$ and the switch $ES^3$, controls the operation of the main bell motor, so that the latter cannot be operated until after the upper bell has discharged a predetermined number, of loads—in the particular arrangement described, seven. This drum, by means of the contact 6 and the fingers $L^2$, also provides means for closing the circuit of the magnet coil $F^2$ of the pilot switch $PS^2$ of the small bell motor independently of the controller $A^2$ of the small bell. Through the contact 8 and fingers $N^2$ it controls the circuit of the coil $F^3$ of the pilot switch $PS^3$ of the main bell motor. The drum X closes the circuit of the solenoid coil $C^3$ of the switch $ES^3$ to open the main bell controller circuit after each operation of the main bell. The drum Y controls the closing of the distributer motor controlling circuit, so that the distributer cannot be operated until the main bell has completed its operation. The drums Z open the circuit of the coil $C^4$ of the switch $ES^4$ and of $F^4$ after each movement of the distributer.

In the circuit of the coil $F^2$ of the upper bell motor pilot switch, are placed the make and break switches $G'$ and $G^3$, operated respectively by the plungers of the solenoids of the pilot switches $PS'$ and $PS^3$ of the hopper motor, and the main bell motor, so that the upper bell motor circuit cannot be closed unless the circuits of both these motors is first opened. In the circuit of the coil $F^3$ of the pilot switch $PS^3$ of the main bell motor, are two similar switches $G^2$ and $G^4$, operated respectively by the plungers of the pilot switches $PS^2$ and $PS^4$, so that the main bell operating circuit cannot be closed until the circuits of the upper bell and distributer motors have first been opened. These four make and break switches, $G'$, $G^2$, $G^3$ and $G^4$ act as guards to prevent the premature operation of the parts, whose circuits they control by reason of temporary circuit conditions which might otherwise occur.

The precise manner of making the various connections above described will be best understood by reference to the diagram shown in Fig. 2, in which such connections are completely shown. In this diagram, in order to avoid confusion, instead of carrying the terminals of the various sub-circuits to the respective sides of a single supply circuit or line, I have marked the terminals of these sub-circuits with the proper plus and minus signs to indicate their proper connection to the main circuit.

The particular cycle of operations which is controlled by the specific apparatus illustrated is as follows:—The skip is raised, discharged and lowered, and the hopper revolved 90 degrees; the upper bell is then dumped, the skip raised and lowered, the hopper revolved 180 degrees, and the upper bell dumped; the skip is again raised and lowered, the hopper revolved 270 degrees, and the upper bell dumped; the skip again raised and turns all the parts to their original positions except the drums T and V, which are at different angular positions, without effect, so far as the three-charge cycle is concerned.

It will be noticed that during the operation of the main bell the skip can be hoisted and lowered and the hopper revolved ready to dump the small bell, there being no interference at this time with the motor circuits of these parts. Also after dumping the main bell, the raising or lowering of the distributer can be done at any time while the main bell is being again filled, thus saving time; but in the first case the little bell cannot be dumped until the main bell is closed, and in the second case the main bell cannot be opened until the distributer has been put in proper position.

By keeping the controllers A′, A², A³ and A⁴ closed, or short-circuited, the foregoing operations, with the exception of the movement of the skip, or as many of them as may be desired, can be made entirely automatic.

By changing the ratios of the gears or other connections which actuate the various contact drums, and by the substitution of drums having different arrangement of contacts, the cycle of operation may be changed as may be desired for any particular furnace.

Various means may be employed for actuating the contact carriers by the movements of the charging parts, and various forms of circuit-closing switches may obviously be used without departing from the spirit and scope of my invention, since

What I claim is:—

1. Blast furnace charging apparatus having a plurality of separately movable parts, motive devices for actuating said parts, and controlling means for governing the operation of the motive devices whereby said parts cannot be operated except in a certain predetermined cycle; substantially as described.

2. The combination with two or more blast furnace charging mechanisms, and separate driving means for actuating the same, of means controlled by the movement of said mechanisms whereby they can be operated only in a predetermined cycle; substantially as described.

3. The combination with blast furnace charging parts and motors for actuating the same, of means controlled by the operation of said parts, whereby said motors are inoperative except in a predetermined order or sequence in a definite cycle; substantially as described.

4. The combination with two or more blast furnace charging parts, and separate actuating devices therefor, of automatic means for preventing the operation of the actuating devices, and charging parts, except in a predetermined order or sequence in a definite cycle; substantially as described.

5. Blast furnace charging apparatus having a plurality of separately movable charging parts, motive devices for operating the same, and a plurality of interrelated controllers for the motive devices operated by the movements of the charging parts to prevent the operation of the motive devices, except in a definite cycle.

6. The combination with a number of movable blast furnace charging parts, separate means for actuating the same, and electro-magnetic switches controlling the operation of the actuating means, and themselves controlled by the operation of the movable charging parts, and arranged to compel the operation of such parts in a predetermined cycle.

7. The combination with two or more movable furnace charging parts including a skip or hoist, and separate means for actuating such parts, of electro-magnetic switches controlling the circuits of the actuating means, the several switches having interdependent connections, and means controlled by the movement of the charging parts and skip for controlling the action of the switches; substantially as described.

8. The combination with two or more movable furnace charging parts including a skip or hoist, and motive devices for actuating the same, of electro-magnetic switches controlling the circuits of the devices, interdependent circuits for the said switches, and movable contact devices actuated by the moving furnace charging parts and by the skip or hoist for automatically controlling the electro-magnetic switches; substantially as described.

9. The combination with two or more movable furnace charging mechanisms including a skip or hoist, and motors for actuating the same, of controllers for the motors, electro-magnetic switches controlling the circuits of the controllers, said switches having interdependent circuits, and movable contact devices actuated by the charging mechanisms and skip for automatically controlling the switches and circuits; substantially as described.

10. The combination with a plurality of furnace-charging mechanisms having related operations, of normally inoperative motors for actuating such mechanisms, and electro-magnetic means controlled by the movements of the mechanisms for controlling the operations of the motors whereby the said motors are rendered operative only in a certain predetermined cycle; substantially as described.

11. The combination with two or more furnace charging mechanisms, having a related operation, of motors for actuating such mechanisms, electro-magnetic switches controlling the operations of the motors, movable contact devices operated by the mechanisms for controlling the action of the switches to close the circuits of the motors in a certain predetermined cycle, and automatic signals for indicating the proper time of operation of each mechanism; substantially as described.

12. The combination with a plurality of blast furnace charging mechanisms, and motors for actuating such mechanisms, of electro-magnetic switches for controlling the operations of the motors, inter-related circuits for the switches, means actuated by the mechanisms for controlling such circuits, and switches whereby the operations of the said mechanisms must occur in a predetermined sequence and cycle, together with means for indicating to the operator the proper time for the operation of each of the mechanisms; substantially as described.

13. The combination with two or more movable furnace charging mechanisms, and motors for actuating the same, of controllers for the motors, electro-magnetic switches controlling the circuits of the controllers, said switches having interdependent circuits, and movable contact devices actuated by the charging mechanisms for automatically controlling the switches and circuits, together with normally open pilot switches in the circuits of the motors and controlled by the motor controllers; substantially as described.

14. The combination with two or more movable furnace charging mechanisms, and motors for actuating the same, of controllers for the motors, electro-magnetic switches controlling the circuits of the controllers, said switches having interdependent circuits, and movable contact devices actuated by the charging mechanisms for automatically controlling the switches and circuits, pilot switches in the motor circuits, and make and break switches operated by the pilot switches and inserted each in the circuit of another controller; substantially as described.

15. The combination of charging mechanism at the top of a furnace, a skip or hoist for delivering stock thereto and motors for operating said charging mechanism and whose operation is controlled by the movements of the skip or hoist and thereby rendered inoperative except upon the completion of certain predetermined operations of the skip or hoist; substantially as described.

16. The combination with charging mechanism at the top of a furnace, a skip or hoist for delivering stock thereto, motors for operating the charging mechanism and the skip or hoist, and controlling devices for the said motors having interdependent circuits, and means operated by the said mechanism and the skip or hoist, whereby the operation of the motor or motors for the charging mechanism is controlled by the movement of the skip or hoist, and the operation of the skip or hoist is controlled by the operation of the charging mechanism; substantially as described.

The combination with charging mechanism at the top of a furnace, a skip or hoist for delivering stock thereto, motors for operating the charging mechanism and the skip or hoist, and controlling devices for the said motors having interdependent circuits, and means operated by the said mechanism and the skip or hoist, whereby the operation of the motor or motors for the charging mechanism is controlled by the movement of the skip or hoist, and the operation of the skip or hoist is controlled by the operation of the charging mechanism, together with circuit controlling means whereby the different moving parts of the charging mechanism can be actuated only in a predetermined order or sequence; substantially as described.

18. In blast furnace charging mechanism, a small bell, a skip or hoist, motive devices for the bell and the skip or hoist, and interrelated controlling mechanism for said motive devices arranged to prevent the operation of the skip or hoist except when the small bell is closed; substantially as described.

19. In blast furnace charging mechanism, a small bell, a skip or hoist, motive devices for the bell and the skip or hoist, and interrelated controlling mechanism for said motive devices arranged to prevent the operation of the skip or hoist except when the small bell is closed, and also to prevent the operation of the small bell until after the skip or hoist has discharged its load; substantially as described.

20. In blast furnace charging mechanism, a small bell, a large bell, motive devicese for said bells, and interrelated controlling mechanism for said motive devices, whereby the large bell cannot be operated until after the small bell has discharged a predetermined number of loads; substantially as described.

21. In blast furnace charging mechanism, a small bell, a rotary hopper, motive devices for said bell and hopper, and interrelated controlling mechanism for said motive devices arranged to compel the operation of the bell and hopper in a certain predetermined manner; substantially as described.

22. In blast furnace charging mechanism, a rotary hopper, a small bell, a large bell, motive devices for the hopper and bells, and interrelated controlling mechanism for the motive devices arranged to prevent the operation of said devices except in a predetermined order; substantially as described.

23. In blast furnace charging mechanism, a small bell, a large bell, a distributer, motive devices for the bell and distributer, and interrelated controlling mechanism for the motive devices arranged to prevent the operation thereof except in a predetermined cycle; substantially as described.

24. In blast furnace charging mechanism, a small bell, a large bell, a rotary hopper, a distributer, motive devices for the bells, hopper and distributer, and interrelated controlling mechanism for said motive devices arranged to prevent the operation thereof except in a predetermined cycle; substantially as described.

25. In blast furnace charging mechanism, a main bell and a distributer, movable within the furnace below the main bell motive devices for the bell and distributer, and interrelated controlling mechanism for the motive devices whereby the distributer cannot be operated until after a certain predetermined number of operations of the bell; substantially as described.

26. In blast furnace charging mechanism, a blast furnace charging part, a motor for operating the part, a controller for the motor, a pilot switch in the motor and controller circuit, and means whereby the pilot switch cannot be closed except under predetermined conditions; substantially as described.

In testimony whereof, I have hereunto set my hand.

BARTON R. SHOVER.

Witnesses:
BRADEN T. GILLESPIE,
O. L. BEARDSLEY.